INVENTORS
WALTER L. DRAY
FRANK V. KUZMITZ
BY
ATTORNEY

Fig.3

Feb. 17, 1953   W. L. DRAY ET AL   2,628,472
FUEL METERING SYSTEM FOR GAS TURBINE ENGINES
Filed Feb. 3, 1949   5 Sheets-Sheet 5

DOUBLE THROW SWITCH

INVENTORS
WALTER L. DRAY
FRANK V. KUZMITZ
BY
ATTORNEY

Patented Feb. 17, 1953

2,628,472

UNITED STATES PATENT OFFICE 2,628,472

FUEL METERING SYSTEM FOR GAS TURBINE ENGINES

Walter L. Dray and Frank V. Kuzmitz, South Bend, Ind., assignors to Bendix Aviation Corporation, South Bend, Ind., a corporation of Delaware Application February 3, 1949, Serial No. 74,322

24 Claims. (Cl. 60—39.28)

This invention relates to a fuel feeding system for gas turbine engines, particularly turbojet and turbopropeller engines for aircraft; and an object of the same is to reorganize and correlate a fuel control device of the type shown in the copending application of Frank C. Mock, Serial No. 716,154, filed December 13, 1946 (common assignee), and a variable stroke injection pump, for example, a pump of the type shown in U. S. Patent No. 2,403,371, Ifield et al., to obtain fuel metering with the advantages inherent in said control device and at the same time have available the extremely high delivery pressures at the fuel discharge nozzles which are desirable for better atomization in engines having certain characteristics and which high pressures tend to produce boiling of the fuel when a by-pass relief system is used in maintaining the desired pressure across the control.

Another object is to provide a fuel feeding system incorporating a fuel metering device to which fuel is supplied under pressure by a variable stroke displacement pump wherein the pump stroke is advantageously controlled as a function of the metering rate.

Another object is to provide a fuel feeding system of the type specified wherein the flow of fuel to the discharge nozzles will be highly sensitive to the action of a manual control such as a throttle valve over a relatively wide pressure range.

Another object is to provide a fuel feeding system for gas turbine engines having an inbuilt emergency control which is simple in construction, yet efficient in operation, and which may be brought into operation instantly and automatically whenever its use becomes necessary.

A further object is to provide a fuel feeding system for gas turbine engines for aircraft incorporating an all-speed governor control for maintaining pilot selected engine speeds irrespective of changes in air density or aircraft speed and a variable displacement pump which is automatically regulated to supply fuel under pressure to the control without lag upon demand of the control.

A still further object is to improve the idling system in a control for gas turbine engines.

The foregoing and other objects and advantages will become apparent in view of the following description taken in conjunction with the drawings, wherein.

Figure 1:
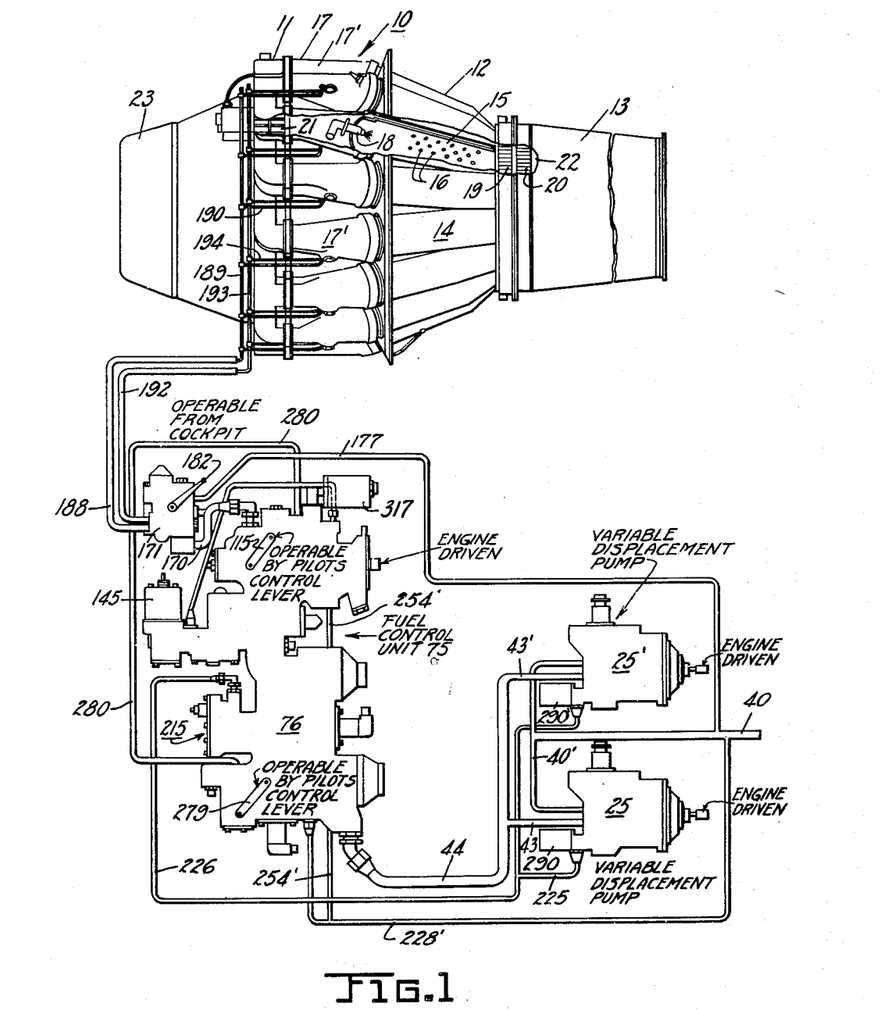
Figure 1 is a view in elevation and partly broken away of a gas turbine engine for aircraft equipped with a fuel feeding system in accordance with the present invention, said system being shown schematically.

Referring first to Figure 1, a gas turbine power plant in the form of a turbojet propulsion engine for aircraft is generally indicated at 10; in general, it comprises a compressor rotor assembly 11, a turbine rotor assembly 12 and an exhaust unit including a tail cone 13.

The turbine rotor assembly includes a plurality of annularly disposed combustion chambers 14, each comprising an outer tubular shell in which is mounted a flame tube or burner 15, spaced from the outer shell and formed with a series of openings 16 for admitting compressed air into the tube. An air adapter or header section, generally indicated at 17, is detachably connected to the front end of the burner assembly; it comprises a plurality of air adapters 17', one for each combustion chamber, which direct air under pressure to said chambers, where it enters the flame tubes 15 and mixes with the fuel discharged from burner nozzles 18 to effect combustion, the expanded air and products of combustion being discharged from the burner tubes through stator blades forming part of a nozzle diaphragm assembly 19 and then through the blades of a turbine rotor 20 to effect rotation of the latter.

The compressor rotor assembly mounts a dynamic compressor 21, which may be either of the centrifugal of axial flow type, driven by the turbine rotor 20 through suitable shafting, not shown, to force air under pressure into the air adapters or headers 17'.

The expanded air and products of combustion, after passing through the blades of the turbine 20, are discharged to the atmosphere through a reaction tube 22 mounted in the exhaust cone 13, to effect propulsion of an aircraft in which the engine may be mounted. Propulsion may also be effected, in whole or in part, by a propeller, not shown, but which may also be driven from the turbine 20.

The various accessories which go to make up the complete power plant 10 are usually mounted at the front of the engine and in part housed by a suitable streamlined casing 23. Among these accessories is the fuel feeding system of the present invention, which is removed from the housing and shown schematically to simplify the drawings and description.

The fuel feeding system comprises in general a pair of variable stroke displacement pumps 25, 25' operating to supply fuel under pressure in series to the fuel control unit or metering device 75. Although in the example shown two pumps are used, it will be understood that one or any number may be utilized, depending upon the requirements of the particular engine to be supplied with fuel.

Figure 2:
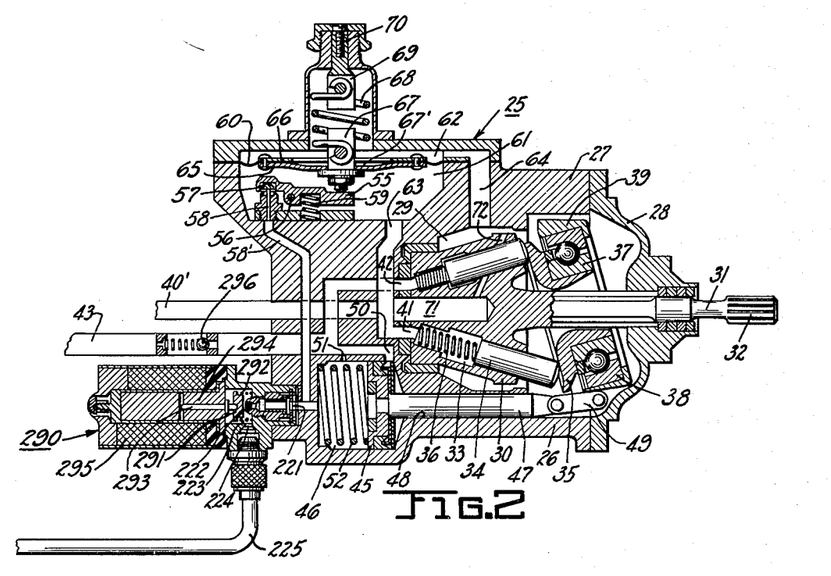
Figure 2 is a view in longitudinal section of one of the variable stroke displacement pumps.

Referring to Figure 2, the pump illustrated therein and generally indicated at 25 is primarily of the type shown in U. S. Patent No. 2,403,371. It comprises a suitable casing including a hollow body 26 having therein a bearing section 27 and at its outer end a combined bearing and end plate or cover 28. The section 27 is formed with a chamber 29 in which is mounted a rotating plunger housing or body 30 having a drive shaft 31 projecting therefrom and provided at its outer end with a suitable drive spline 32 adapted to have a driving connection with the engine 10. The plunger housing 30 is formed with a series of elongated bores 33 in each of which is mounted a plunger 34, the latter being positively urged in a fuel displacing or pumping stroke direction by means of a wobble plate 35 and in a fuel intake or suction stroke direction by a spring 36. The wobble plate is engaged within the inner race 37 of a thrust bearing 38 and the entire wobble plate and bearing assembly is carried by a supporting member 39. Fuel from a suitable source of supply flows to the pumps by way of conduits 40 and 40' to intake port 41; and when the springs 36 cause the plungers to exert a suction stroke, the fuel is drawn into the bores 33, and when said plungers are caused to exert a pumping stroke by the action of the wobble plate, the fuel is discharged by way of port 42 and conduit 43 (or 43' from pump 25') to the fuel line 44 (Figure 1) which leads to the fuel control or metering device 75 shown more or less in detail in Figures 3 and 4.

The stroke of the plungers is rendered variable by means of a spring loaded piston 45 which is mounted to reciprocate in a chamber 46 and has secured thereto a rod 47 which projects through a suitable guide bore 48 formed in the housing 26 and connects by means of a link 49 with the wobble plate bearing support 39. The chamber 46 is open to discharge pressure at the one side (decrease stroke side) of the piston by way of a vent passage 50, and at the opposite side (increase stroke side) by means of a restricted orifice 51. A spring 52 normally urges the piston in a stroke increasing direction. The spring load and pressure venting is coordinated in a manner such that when the chamber 46 on the spring side of the piston 45 is closed against the escape of fuel to a lower pressure source, the spring will move the piston to maximum stroke position (the position shown in Figure 2), but when the said spring side is vented, either by opening movement of the pump excess pressure and overspeed governor valve 57 or through the action of the pump control device or amplifier 215, to be described, the piston will be moved by discharge fuel pressure to a reduced output position.

A maximum pump pressure and overspeed governor assembly is provided and includes a rocker arm 55 which is pivoted or fulcrumed at 56 and carries valve 57 at its one end adapted to control a vent 58 forming a continuation of a passage 58' leading to the chamber 46 on the spring side of the piston 45. A spring 59 normally urges the rocker arm 55 in a direction to cause the valve 57 to close the vent 58. The rocker arm is rotated in a direction to open the vent passage 58 by the action of a diaphragm 60, which separates chamber 61 from chamber 62, the chamber 61 being open to fuel inlet pressure by way of passage 63 while the chamber 62 is open to inlet pressure by way of passage 64.

The diaphragm 60 is clamped between a pair of plates 65 and 66, the plate 65 having connected thereto a member 67 having a contact head 67' adapted to engage the one end of the rocker arm 55. A spring 68 connects at one end to the member 67 and at its opposite end is connected to an anchor member 69, adjustable by means of a screw 70.

When the pressure in chamber 46 on the stroke increasing side of piston 45 (which pressure is a measure of pump discharge pressure) exceeds a predetermined value as set by the spring 59, it rocks the arm 55 in a clockwise direction, raising valve 57 and opening vent passage 58. This reduces the pressure in chamber 46 on the spring side of the piston 45 and the latter moves in a direction to reduce the pump stroke.

The maximum speed governor function is obtained by means of a central bore 71 containing fuel at inlet pressure, and one or more passages 72 leading therefrom to the chamber 29. When the speed of the rotating plunger housing or body 30 exceeds a predetermined maximum, the centrifugal action of the fuel thrown outwardly through the passage 72 builds up pressure in the chamber 29 and through passage 64 in chamber 62 to a point where the predetermined differential across the diaphragm 60 is overcome and the latter is moved downwardly, opening valve 57 and the vent passage 58.

The fuel control device or unit is generally indicated at 75 in Figure 1. The lower part 76 of the unit includes the fuel input and pump control section of Figure 3 and it also includes the regulator valve assembly shown at the bottom of Figure 4.

Figure 3:
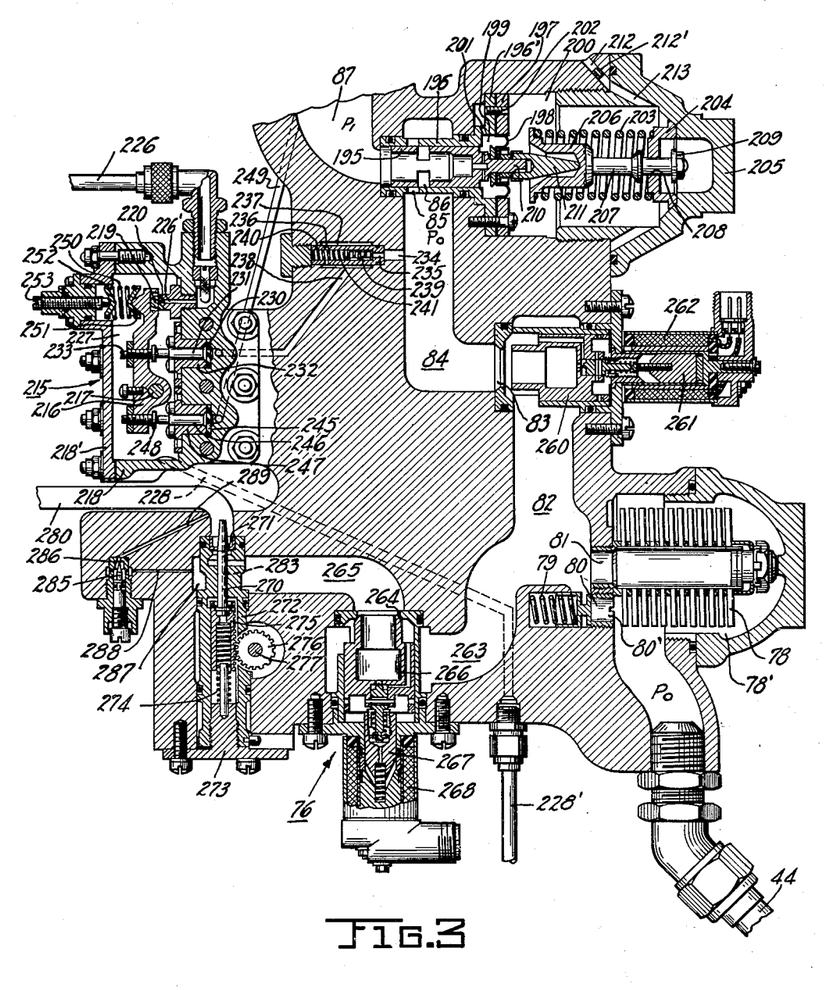
Figures 3 and 4 are sectional schematic views of the fuel control device or unit generally indicated at 75 in Figure 1, Figure 3 showing the lower (input and pump control section) part, and Figure 4 the upper (regulator and governor section) part of said device.

Referring now to Figure 3, fuel under pump pressure flows to the input section by way of fuel line or conduit 44; it passes through a filter 78 located in a chamber 78'. The drop across the filter is preferably held to a predetermined maximum by a spring loaded relief valve 79 which controls a by-pass 80, defined by a removable and replaceable valve seat 80'. After passing through the filter 78, the fuel flows by way of passages 81 and 82, valve port 83, see Figure 4, passage 84, valve ports 85, 86, passage 87, valve port 88 and across a regulator valve 90 to regulator chamber 89 and governor chamber 89'.

Valve port 83 is subject to closure by a normally open emergency control solenoid valve 260, Figure 3, and valve ports 85, 86 are controlled by a spring loaded pressure drop regulating valve 195, both of which valves will be subsequently described.

Figure 4:
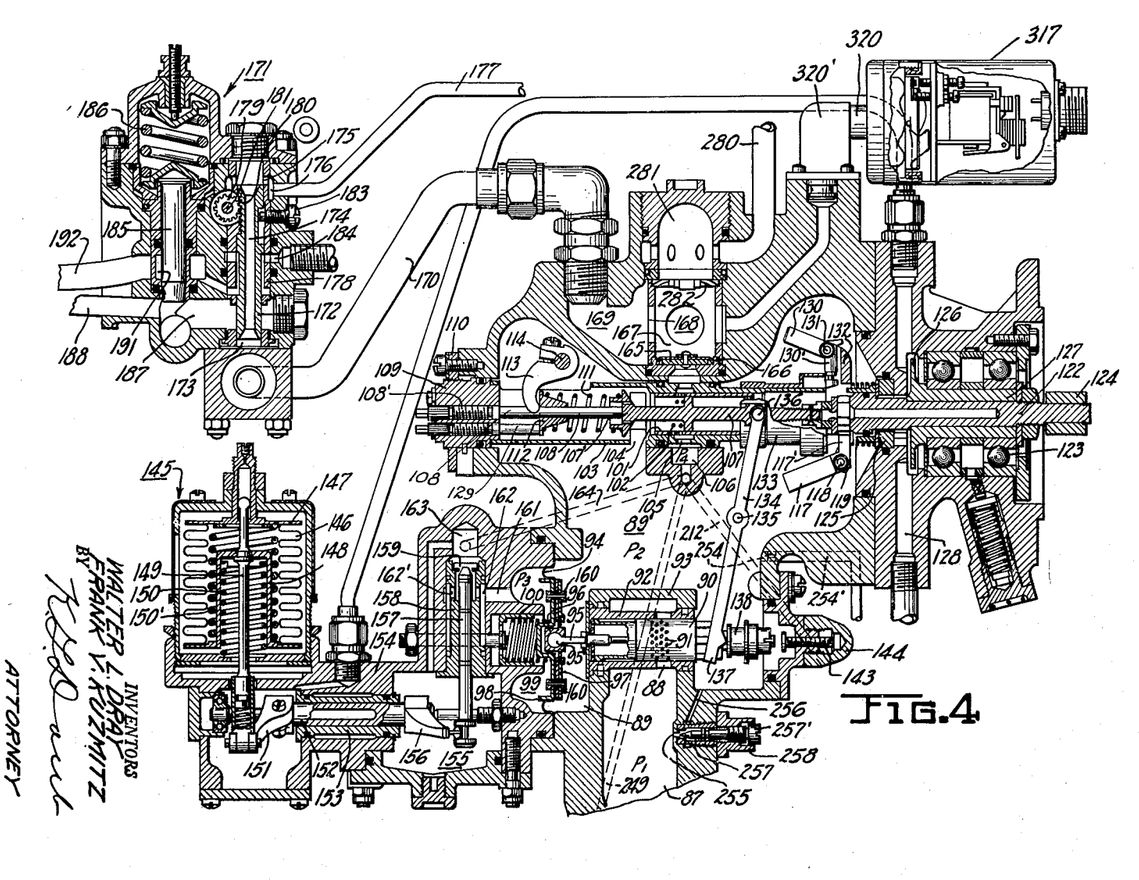

From chamber 89', Figure 4, the fuel flows across a governor valve 101, at which point it is metered, the metered fuel then flowing to the fuel discharge nozzles 18 by way of annular chamber 106, valve chamber 167, chamber 169, conduit 170 (compare Figure 4 with Figure 1), across pressurizing valve and shut-off cock 171, through parallel low and high pressure conduits 188, 192 and coacting fuel manifolds 189, 193, and nozzle supply lines or pipes 190, 194.

The principal function of the regulator valve 90 is to maintain a metering head across the governor valve as a function of engine speed, so that irrespective of how suddenly or how much the governor valve may be opened to accelerate the engine, the rate of fuel feed will not increase beyond a certain value predicated on a maximum safe burner temperature; and when the governor valve is closed to decelerate, the metering head will be such as to produce a gradual reduction in flow to prevent burner blowout or failure. The valve as shown in Figure 4 consists of a hollow cylinder having therein a plurality of holes or orifices 91 adapted to register with the ports 88, whereupon fuel flows through the interior of the cylinder to chamber 89; it is mounted to slide in a cylindrical housing of bushing 92 secured in a boss 93 formed integral with the main housing or casting of the device.

A metering head diaphragm is indicated at 94; it is connected to the stem 95 of the regulator valve 90 through the medium of a ball head 95' formed on the one end of said stem and engaging in a socket 96 which is carried by a diaphragm plate 97 coacting with an adjacent plate 98 to reinforce the central portion of the diaphragm 94, the latter constituting a movable wall between unmetered fuel chamber 89 and a density compensating fuel chamber 99. A spring 100 bears at its inner end against and is centered by a dish-shaped portion formed in the center of the diaphragm plate 98. This spring coacts with the unit shown in Figure 10 to maintain the metering head at a predetermined value at low engine speeds, as will be subsequently described.

A governor valve is indicated at 101; it is in the form of a hollow cylinder formed with a series of holes or ports 102 and is slidingly mounted in a cylindrical valve cage or sleeve 103 formed with entrance openings or ports as at 104, through which fuel from the chamber 89' flows into the valve cylinder and thence passes through ports 102 and 105 to annular valve chamber 106. The governor valve 101 is secured on an elongated valve stem or rod 107. At its left-hand end, the stem 107 is abutted by a rod 108 provided at its outer extremity with a threaded screw head 108' secured in a bushing 109, the latter in turn being mounted in the main housing of the control and secured in place by means of an end plate 110. The rod 108 constitutes a minimum flow setting means or stop in that it abuts the head 107' of the valve stem 107 and determines the minimum flow position of the governor valve 101.

A governor spring is indicated at 111; it abuts at its inner end the head 107' of the valve stem 107 and at its outer end is engaged by a bushing 112 slidably mounted on the rod 108, the bushing in turn being engaged by the active end of a lever 113 adjustably secured on a shaft 114, the latter extending through the control housing and having secured on the outer end thereof a lever 115 (see Figures 1 and 5) which may be controlled in any suitable manner from a remote point; in the present instance, to simplify the disclosure, it is connected to an adjustable link 116 which in turn connects with the emergency throttle valve 270 and through the latter with the pilot's control lever, as will be more fully described.

The valve 101 is under the control of an all-speed governor, including a pair of governor weights, one of which is indicated at 117; it is pivotally mounted at 118 on a bracket 119 and at its inner end is formed with an arm 117' which bears against a disc-shaped contact or bearing member 120 secured on the adjacent end of the stem 107. The bracket 119 is formed integral with the inner end of a shaft 122, which is mounted in bearings 123 and on its outer end carries a driving spline 124 adapted to be driven from the engine. A seal assembly, generally indicated at 125, prevents the escape of fuel from the chamber 89' to the exterior of the unit around the shaft 124. A slinger ring 126 is formed on the inner end of a bearing hub or bushing 127 and functions to catch any fuel that may leak past the seal 125 and throw it outwardly into a drain passage 128.

An adjusting rod or screw 129 projects through and is threaded in the bushing 109; its inner end is adapted to engage the slidable bushing 112 and determine the minimum governor spring loading and hence minimum engine speed when the pilot sets his throttle to its lowest idle position and at which time lever 113 is clear of bushing 112.

The governor valve assembly as above described and as shown in Figure 4 has certain important advantages. The basically essential elements of the all-speed governor are the centrifugal or fly weights 117, which must be rotatably mounted, the governor or metering valve 101 and the spring 111, the latter two elements being non-rotatably mounted. These three elements bear a mutual operating relationship to one another. Thus when the valve is at a given flow position, the weights should be at a certain radius and the spring under a certain tension. Hence, it is desirable to have a readily adjustable yet secure association of these respective parts, and this is afforded by the assembly as herein disclosed. By means of the external adjustment provided by the end plate or collar 110, the sleeve 103 may be located or reset with respect to the governor valve 101 to determine the maximum effective valve opening or area at full throttle setting and secure mutual positioning of coacting parts for calibration purposes; and this adjustment together with the minimum flow and governor spring adjustments afforded by the screws or threaded rods 108 and 129, which are both externally accessible, contribute materially to the ease and accuracy with which the fuel control device may be tested and serviced.

One of a pair of centrifugal head generating governor weights is indicated at 130; it is pivoted at 131 on a bracket 132 projecting from shaft 122 similar to bracket 119 and has the inner arm 130' thereof adapted to engage a sleeve 133 slidingly mounted on the cylindrical member 103. A lever 134 is pivoted or fulcrumed at 135 and at its upper end is pivotally connected to the sleeve 133 at 136 and at its lower end is formed with a fork or yoke 137 which engages a sliding sleeve 138 forming part of the constant head idle assembly of Figure 10. The sleeve 138 is slidably telescoped over a spring retainer or housing 139 in which a spring 140 is seated and at its free end engages a flange 141 formed on said sleeve. A nut 142 adjustably limits the travel of sleeve 138 under spring thrust. The free end of the retainer 139 is secured to the stem of the valve 90.

At low engine speeds, as for example during starting, it is desirable to have an idle flow which will give sufficient pressure at the discharge nozzles to obtain good atomization, and it is also desirable that this flow remain constant when the engine is operating below some predetermined speed. This result is obtained by the device shown in detail in Figure 10. Thus, when the engine is above some predetermined value, the force exerted by the centrifugal weights 130 holds the flange 141 of the sleeve 138 against the adjacent end of the retainer member 139 and the spring has no effect on the position of valve 90. However, at speeds below such value, the spring force overcomes that of the weights and sleeve 138 moves clear of the member 139, whereupon said spring acts to position the valve 90 and maintains the head across the throttle valve 101 substantially constant. The spring 100 determines the minimum idle head regardless of speed. Thus, at altitude the idle speed may be considerably above that set for the constant head idle device of Figure 10, yet the fuel flow may still go so lean as to result in burner failure or retard acceleration were it not for spring 100.

Figure 10:
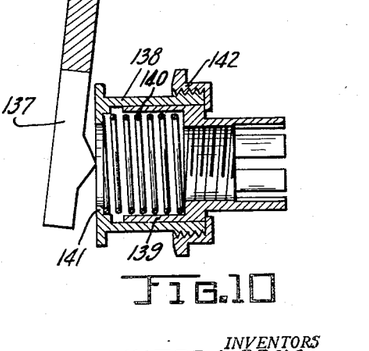
Figure 10 is a detail sectional view of a device or unit which coacts with the fuel head regulator valve to maintain a substantially constant idle flow at predetermined low engine speeds.

The maximum open position of the valve 90 is adjustably determined by means of screw 143, accessible upon removal of a cap 144.

In the schematic view of Figure 4, one of the all-speed governor valve weights 117 and one of the centrifugal head generating weights 130 are shown arranged in what appears to be opposed relation, or 180° apart. In the control as actually built, however, there is a pair of all-speed governor weights and a pair of speed metering or centrifugal head generating weights pivotally mounted in opposed relation.

To compensate or correct the metering differential for changes in air density, an aneroid assembly generally indicated at 145 is provided and includes a spring loaded bellows or capsule 146 which is anchored at one end to a bushing 147 carried by an outer casing or housing, and at its opposite or movable end is secured to an inverted cup-shaped member 148 engaged with a connecting and guide rod 149 through an interior relatively light loading spring 150 acting counter to another heavier loading spring 150' located exteriorly of said member within the bellows. It is preferred to use a pair of coacting springs as shown to improve the sensitivity of the aneroid. The bellows 146 is loaded for response to changes in both pressure and temperature (see Patent 2,376,711 to F. C. Mock), and is preferably located where it will be subjected to ram or compressor inlet pressure. The rod 149 is pivotally connected to the one end of a lever 151, the opposite end of said lever being secured to the outer end of a shaft 152, rotatable in a sealed bearing 153 supported by a housing 154. The one end of shaft 152 projects into a chamber 155 and has secured thereon a lever 156, which is pivotally and adjustably connected to the lower end of a density compensating needle valve 157, mounted for sliding movement in a bushing 158 and contoured at its upper end to regulate the flow of fuel through a variable orifice 159. A pair of density circuit control jets 160 communicates the unmetered fuel chamber 89 with the density compensating fuel chamber 99; and fuel may flow from the chamber 99 to the orifice 159 by way of passage 161, annular chamber 162 and ports 162'. From the orifice 159, fuel may flow to chamber 163 and thence by way of drilled passage 164 to the metered fuel chamber 106.

The fuel pressures existing in the various flow passages and chambers may be appropriately designated as follows:

$P_0$—Pump discharge pressure
$P_1$—Control inlet pressure
$P_2$—Unmetered fuel pressure
$P_3$—Density compensating pressure
$P_4$—Metered fuel pressure Since the shaft 122, which carries the speed metering weights 130, is driven in relation to engine speed, said weights will exert a force tending to open the regulator valve 90 proportional to the square of engine speed. As this valve opens, however, $P_2$ pressure builds up in chamber 89 and acts on the diaphragm 94 in a direction tending to close the valve. The pressure differential across diaphragm 94 is imposed across the feed restriction defined by the governor valve holes or ports 102 in relation to ports 105, and since this differential is proportional to the square of engine speed, for any given position of the said governor valve and the density needle 157, the velocity and hence the weight of fuel flowing through said restriction or across said valve will be proportional to the square root of this differential or to the speed directly. Movement of the governor valve in a direction to increase the area of the feed restriction (to the right in Figure 4) momentarily decreases the differential across the diaphragm 94, whereupon the regulator valve 90 moves toward open position (also to the right), feed of fuel to the burners is increased and the engine speeds up until the governor weights 117 balance the new setting of the governor spring 111 and a condition of equilibrium is obtained; movement of said governor valve in a direction to restrict the area of the feed restriction has the opposite effect. During acceleration and deceleration, therefore, the metering head will vary as a function of engine speed, as will also the quantity of air flowing to the burners.

Upon a decrease in the density of the air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude than at sea level under similar engine conditions, due to the extremely rich fuel-air ratio. This is the reason for the density control circuit just described. A decrease in entering air density causes elongation of the bellows 146 and an increase in the area of the orifice 159, while an increase in density has the opposite effect.

For a given engine or turbine speed, the differential across the metering head diaphragm 94 ($P_2-P_3$) will be constant, and hence the flow through the control jets 160 at this time will be constant. All flow of fuel through jets 160 will pass through the orifice 159, and hence the drop across the latter orifice will vary inversely as the square of its area, and for a fixed or given position of the needle 157 (constant density) the drop across the orifice 159 ($P_3-P_4$) will be proportional to the drop across the jets 160 ($P_2-P_3$). The sum of the drop across the orifice 159 and the drop across the diaphragm 94, or jets 160, is substantially equal to the drop across the governor valve 101 ($P_2-P_4$), and at a given density, the total drop will be proportional to the square of engine speed. As the effective area of orifice 159 is enlarged, there will be a corresponding decrease in the drop across this orifice and a reduction in head across the governor valve 101, resulting in a diminishing flow of fuel to the burners for a given area of the feed restriction defined by the governor valve orifices 162 and the coacting ports 185. Thus, if the governor valve 101 is opened for acceleration at a certain altitude, less fuel will be supplied to the burners than would be the case at ground level or at some lower altitude. By suitably contouring the needle 157, substantially complete density compensation may be obtained. This advantage is not only present upon acceleration and deceleration, but it also will maintain a given engine or turbine speed at all altitudes for any fixed or given position of the pilot's control lever, or the governor valve 113.

From annular chamber 106, Figure 4, metered fuel flows past one-way flap valve 165, which is hinged at 166, into valve chamber 167 and out through ports 168 into chamber 169, thence by way of conduit 170 to the fuel shut-off and two-stage nozzle pressure valve assembly or unit generally indicated at 171. This unit comprises a shut-off valve 172 which at its lower end controls a port 173. The valve 172 is hollow or is formed with a passage 174 which when the valve is closed communicates with or is vented to the fuel input conduit 40 by way of ports 175, annular chamber 176 and passage or conduit 177. In this manner, the pressure across the valve is balanced when the valve is closed so that the valve will not tend to move to open position due to a build-up of pressure upstream thereof and may be easily controlled. The shut-off cock of valve 172 is slidable in a bushing or bearing 178 by means of a pinion or rack gear 179 in mesh with a toothed rack 180, said gear being secured on a shaft 181 which projects through the main valve housing and has connected to the outer end thereof a lever 182. The valve is limited in its reciprocatory movement by a screw 183. A vent 184 permits any fuel which may leak past the valve or its bushing to escape to drain or back to the fuel tank, as desired.

The valve indicated at 185 is for use with a so-called duplex or two-stage spray nozzle; that is, a nozzle in which fuel at a low metering head flows through a set of primary passages to a discharge jet, and when the metering pressure reaches a certain value, the fuel is automatically directed through a set of larger passages to said jet. In the system shown, the valve 185 is held closed by spring 186 at low metering heads, at which time fuel may flow to the nozzles 18 by way of passage 187, low pressure fuel line 188, manifold ring 189 and fuel lines 190 only, but when the metering head increases beyond a predetermined value, the valve 185 moves to open position and permits fuel to flow to the said nozzles by way of valve chamber 191, fuel line 192, main fuel manifold ring 193 and fuel lines 194.

Up to this point, the fuel control unit, with the exception of the two-stage nozzle and coacting valve and other structural changes in design, is substantially the same as that disclosed in the copending application of Frank C. Mock, Serial No. 716,154, heretofore noted.

The valve indicated at 195, Figure 3, for controlling port 85 is an automatic throttling valve; it tends to maintain a constant pressure drop across the control, overcomes lag in $P_0$ or pump discharge pressure, and it coacts with the pump stroke control device or amplifier 215 to maintain pump output pressure above a low unstable range. The valve itself is shown as of cylindrical form mounted to slide in a sealed bushing 196 formed with a mounting flange 196′, between which and a plate 197 is secured a diaphragm 198, the latter constituting a movable wall or partition between chambers 199 and 200. To insure proper functioning of the diaphragm, chamber 199 is vented to chamber 200 by vent 201 and passage 202. A spring 203 has its one end abutting a stepped bushing 204 seated in a cap or cover 205, and its opposite end engaging a cup-shaped member 206 having a stem 207 slidably projecting through an opening 208 in the bushing 204, movement of the member 206 in a valve opening direction being limited by an adjustable nut 209. The valve 195 has connected thereto a stem 210 which projects through the center of the diaphragm 198 and carries a cone-shaped abutment member 211 which projects into the cup 206. Metered fuel or $P_4$ pressure is communicated from chamber 106 of Figure 4 to the valve opening side of the diaphragm 198 of Figure 3 by way of passage 212, annular chamber 213 and chamber 200, the passage 212 having a calibrated bleed or restriction 212′ therein.

The effective exposed areas of the diaphragm 198 and valve 195 are preferably such that the $P_1$ pressure on opposite sides thereof balances the valve, and hence the $P_1$ pressure in passage 87 will be maintained at a constant value over and above metered fuel or $P_4$ pressure as determined by the effective force of spring 203, or in other words, there will be a substantially constant pressure drop across the regulator valve 90 and governor or main throttle valve 101. The valve 195 is also arranged to coact with a minimum pump output pressure device or amplifier generally indicated at 215 and which will now be described.

The pump stroke control device or amplifier 215 comprises a rocker arm 216 which is fulcrumed on a shaft 217, journaled at its opposite ends in a housing 218 provided with a cap or cover 218′. At its one end (upper end as shown in Figure 3) the rocker arm carries a half ball valve 219 adapted to control a vent passage 220, through which fuel from the spring side of the pump control piston 45 in control chamber 46, see Figure 2, may by-pass back to the low pressure side of the pumps by way of passage 221, restriction 222, valve chamber 223, port 224, passage defined by conduits 225, 226, 226′, see Figures 1 and 3, vent 226, chamber 227, passage 228 and conduit 228′. The rocker arm 216 is urged in a direction tending to unseat valve 219 by $P_0$ or pump discharge pressure which acts on a small diaphragm 230 and through the latter on a piston 231 slidingly mounted in a cylinder 232 and at its outer free end engaging an adjustable contact 233 carried by the said rocker arm 216. Pump discharge pressure is communicated to the diaphragm 230 from passage or chamber 84 by way of passage 234, valve ports 235, 236, valve chamber 237 and passage 238. To dampen out any pressure fluctuations, an attenuator valve 239 is inserted in a valve body 240 between ports 235 and 236; it consists of a series of small discs arranged in spaced relation and held in place by a spring 241. The discs have small holes punched therethrough in offset relation; they act like a condenser in that surges in pressure are dampened out as the fuel encounters resistance to sudden changes in flow. The rocker arm 216 is urged in a direction tending to seat valve 219 by metered fuel or discharge pressure ($P_4$) which acts on a small diaphragm 245 and through the latter on a piston 246 slidingly mounted in a cylinder 247 and at its outer free end engaging an adjustable contact 248 carried by said arm. Metered fuel pressure is communicated to the diaphragm 245 from annular chamber 106 of Figure 4 by way of passage 249; and this pressure is assisted by a spring 250 inserted between a pair of contact plates 251 and 252 and adjustable by a screw 253.

The so-called amplifier or pump stroke control device just described operates as follows:

Upon an increase in metered fuel or $P_4$ pressure, due to an opening movement of the main throttle or governor valve 101 or an increase in the metering head across said valve, the piston 246 acts on the lever 216 in a direction tending to hold the valve 219 seated. This restricts or prevents escape of fuel from the spring side of the piston 45 in chamber 46 of the pump 25 (also the pump 25'), and hence the piston 45 will be urged in a direction for maximum pump output at a given speed. Also, an increase in $P_4$ pressure causes the valve 195 to be urged towards open position to accommodate the demand for an increased supply to the burners. The spring 250 of the amplifier 215 may be adjusted to balance the amplifier in a manner such that at low or idle settings of the governor valve 101, a minimum pump output pressure may be maintained, for example 500 p. s. i. Thus, should the valve 101 be moved to an idling position, which we can assume is the position of the parts shown in Figure 4, then the valve 195 will move towards closed position, and at a given engine speed the $P_0$ pressure in chamber or passage 84 will rise and act through the passage 238 on the piston 231 to move the rocker arm 216 in a direction to unseat the valve 219, thereby opening the vent 220 and permitting fuel to escape from the spring side of piston 45 in pump control chamber 46, whereupon the piston 45 moves to the left, or in a direction to reduce the pump stroke, but such reduction will cease when the spring force (spring 250) is balanced and the pump supply pressure will then remain substantially constant until a further change in metered fuel or $P_4$ pressure. By coordinating the setting of the valve 195 with that of the amplifier 215, the pump output or $P_0$ pressure may be maintained above the low unstable pressure range at low throttle settings.

The bleed indicated at 254 is for bleeding off a certain amount of $P_2$ or control pressure to a lower pressure source. As shown, the bleed is in a passage 254' leading back to conduit 228'. This gives low minimum flows, while at the same time, the clearance between valve 90 and its sleeve or bushing 92 may be made large enough to insure against sticking due to foreign particles or other matter in the fuel.

The small orifice indicated at 255 in Figure 4 is an altitude idle jet; it is located upstream of the regulator valve 90 and controls flow of fuel through a by-pass passage 256 from passage or chamber 87 direct to chamber 89'. The jet 255 is variable by means of a needle valve 257 mounted in a sealed valve body 258 and adjustable by means of a screw 257'. As heretofore noted in conjunction with the operation of the density control circuit, the metering head across the governor valve 101 is compensated for in a manner such that as the air density decreases, due for example to a gain in altitude, the metering head is decreased to correspondingly decrease the flow of fuel to the burners. This, of course, acts across the governor or main throttle valve 101 at all settings of the latter, hence the adjustable minimum flow stop 108 is provided to prevent the engine speed from being reduced at altitude idle settings to a point where the burners are in danger of failure from lack of fuel or compressor or turbine deficiencies make acceleration difficult. Actually, the idle flow should be gauged by the ability of the spray nozzles to deliver a fairly well atomized spray. The needle 257 is preferably adjusted to give an effective area to the jet 255 which is less than the effective flow area of the metering restrictions or orifices 102 when the governor valve 101 is up against its stop 108. Then, starting at sea level, the idle flow is determined by the minimum setting of the governor valve and the head thereacross as determined by the density control circuit. As altitude is gained, however, the idle flow diminishes, since its quantity is affected by the area of the governor valve metering restrictions 102 and the head across the valve, and the idle area remains fixed; also, the regulator valve 90 at idle speeds comes up against the idle spring 100 or is governed by the constant head idle spring 140 and the head produced by the regulator then remains substantially constant. The jet 255 then determines the minimum idle flow (plus leakage across the density control circuit) and the fact that this minimum is uncompensated for is of advantage in engines where the efficiency of the compressor lowers at high altitudes, since as altitude is gained, the idle speed increases and reduces the tendency to compressor or engines stall. Also, an increased idle speed is desirable at extremely high altitudes, since it becomes increasingly difficult to accelerate as the idle speed decreases.

The emergency system comprises a normally open solenoid valve 260, Figure 3, which controls the port 83 just downstream of the filter 78; said valve being connected to an armature 261 which is moved in a valve closing direction upon energization of a coil 262. When the valve 260 is closed, the fuel entering through conduit 44 is caused to flow by way of a passage 263, valve port 264 and passage 265 to an emergency throttle valve 270. The valve port 264 is controlled by a normally closed solenoid valve 266 connected to an armature 267 which is moved in a valve opening direction upon energization of a coil 268. The solenoid coils 262 and 268 are electrically connected in circuit in a manner such that when a condition arises indicative of the necessity for emergency operation, the switchover from normal to emergency operation occurs automatically, as will be described in connection with Figure 6.

The emergency throttle valve 270 controls an orifice or restriction 271; it is mounted to slide in a valve body 272 provided with a flanged cap screw 273. A spring 274 tends to stabilize the valve action. A toothed rack 275 is connected to the one end of the valve 270 and is mounted to slide in the valve body 272 which is open or recessed at this point. The rack 275 is engaged by a gear or pinion 276 secured on a shaft 277, which projects outwardly through the housing 278 and is provided with a lever 279, see Figure 1, operatively connected to the pilot's control lever in a manner to be described.

When the emergency system is in operation, fuel flows across the emergency throttle valve 270 and through conduit 280 to valve chamber 281, see Figure 4, thence across one-way hinged flap valve 282 to chamber 167. From the latter chamber the fuel flows to the discharge nozzles 18 in the same manner as does the metered fuel from the main control. It should be noted that when emergency fuel is flowing, the pressure in chamber 167 acts on the flap valve 195 to close the latter. This prevents the emergency fuel from backing into the main control unit.

The emergency throttle valve 270 is preferably balanced to provide ease in operation; it is formed with a central bore or passage 283, see Figure 3, through which fuel may pass and equalize the pressure across the valve.

An emergency idle system is provided and consists of a needle valve 285 which controls a variable jet 286, permitting a limited amount of fuel to flow across the emergency throttle valve 270 and from chamber 287 through passage 288, jet 286 and passage 289 to the conduit 280.

The pumps 25, 25' may be selectively isolated from one another and also held in maximum stroke position at the will of a pilot or operator by means of a pair of isolating solenoid valves generally indicated at 290 and 290', see Figures 1 and 2, which are of similar construction, each comprising a closure member or valve proper 291, adapted to close the restricted orifice 222 and normally urged toward open position by a spring 292. The valve closure member is centrally abutted by a pin 293 secured to an armature 294. The solenoid coils for the two solenoids are indicated at 295 and 295' and their coacting armatures at 294, 294' to more readily identify these parts in the diagram of Figure 6.

Check valves 296, one of which is visible in Figure 2, in the pump discharge conduits 43, 43' prevent fuel under pressure from backing up through the pumps into the pump inlet in the event of failure of one of the pumps while the other is in operation.

Figure 5:
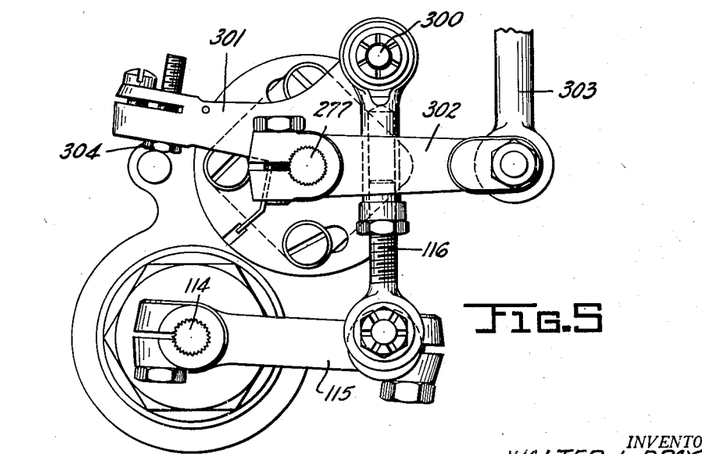
Figure 5 is a plan view of the connection linkage between the main throttle or governor valve and the emergency throttle valve (note: this view is taken from the layout or assembly drawing of the control as built and is not schematic)

Figure 5 shows the coordinating and connecting linkage between the main throttle or governor valve 101 and the emergency throttle valve 270. The link 116 forming part of the main throttle or governor valve linkage pivotally connects at 300 with the one arm of a lever 301 which is adjustably secured on the shaft 277 for operating the emergency throttle valve gear 276 of Figure 3. Also secured on shaft 277 is an arm 302 which at its outer free end is connected to a link 303, the latter being connected to the pilot's main control lever (not shown). A maximum speed contact 304 is adjustably secured on another arm of lever 301. The linkage is shown in idle position. If a pull is exerted on arm 302 through link 303, the main throttle arm 115 will be rotated counterclockwise, producing a similar movement to lever 113 (Figure 4), thereby compressing the governor spring 111 and opening the governor valve 101, at the same time resetting the governor weights 117; also the emergency throttle valve 270 is moved with the main throttle or governor valve to control the emergency metering orifice 271 irrespective of whether or not the emergency system is in operation.

Figure 6:
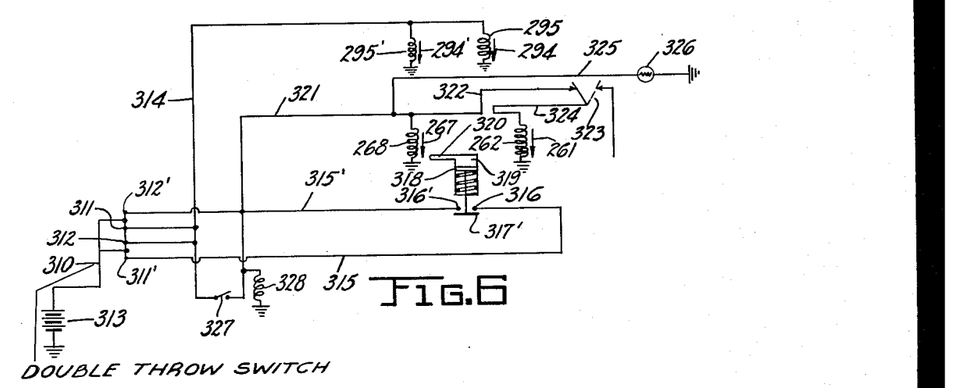
Figure 6 is a wiring diagram of the electric circuit for the emergency control.

Figure 6 shows the electrical circuit for the emergency system and pump isolating solenoids. A double pole, double throw switch 310 is located in the cockpit and is adapted to be moved from the neutral position shown into engagement with take-off contacts 311, 311' or emergency contacts 312, 312'. When the switch is engaged with contacts 311, 311', current may flow from a battery 313 or other suitable source of supply to the pump isolating solenoids 295, 295' by way of line wire 314, closing the valves 222 of Figure 2 and permitting the springs 52 to move the wobble plates 35 to full stroke position. The circuit comprising the contact 311', wire 315, contacts 316, 316', wire 315' and contact 312' is normally open and is closed or energized automatically upon the occurrence of some condition indicating loss of power; in the present instance it is closed when the nozzle ($P_4$) pressure drops below a predetermined value by a pressure switch assembly generally indicated at 317 in Figures 1 and 4 and comprising a switch 317', Figure 6, which is carried by a spring loaded piston 318 mounted in a chamber 319 vented to $P_4$ or nozzle pressure by conduit 320, the latter in Figures 1 and 4 being shown as extending through a switch-supporting member 320'. When switch 317' closes, and assuming switch 310 to be in take-off position, current flows through wires 315, 315', 321 to the coil 268 of the normally closed solenoid valve 266 (compare Figure 6 with Figure 3) opening this valve, and thence through wire 322, switch 323 and wire 324 to the coil 262 of the normally open solenoid valve 260, closing said latter valve. Current also flows along wire 325 to a signal light 326, which indicates to a pilot that the emergency system is in operation. Unless the nozzle pressure drops below a predetermined value while switch 310 is in take-off position, only the pump isolating solenoids will be energized. After take-off, the pilot moves switch 310 to a neutral position, the pump solenoids are de-energized, and pump stroke control is automatic through the amplifier 215 which responds to the drop across the metering device or unit 75. However, the pilot may go into emergency at will simply by moving switch 310 into engagement with contacts 312, 312'. A normally open lock-in relay switch 327 is provided and has a coil 328 which is energized when the emergency circuit is energized and closes the switch 327. This prevents the pressure switch 317 from cutting out the emergency solenoids when on emergency metering. The purpose of the switch shown at 323 is to facilitate a ground check of the emergency system.

*Operation*

No starting mechanism has been shown since any suitable type of such apparatus may be used. Conventional starting systems usually employ an electrical starting motor, controllable from the pilot's compartment, for turning the engine during the starting period, and an ignition circuit including a spark plug or pilot flame located at one or more of the burners for igniting the starting fuel.

When the engine is rotated, the pumps 25, 25' pressurize fuel in conduit 44. Usually during starting, the governor or main throttle valve 101 is in idle position, the position shown in Figure 4, and also at this time the constant drop valve 195 and the regulator valve 99 will be slightly cracked so that fuel may flow across these valves and also across the governor valve 101 to the metered fuel chamber 106 and thence to the burner nozzles 18 by way of chambers 167, 169, conduits 170 and 192 and fuel manifolds 189 and 193. When the engine reaches a self-sustaining speed, the starting motor is disengaged.

The pumps 25, 25' are preferably calibrated to deliver the maximum amount of fuel demanded by the control at any given engine speed without requiring the pump plungers to go to full stroke position, so that at high metered fuel or $P_4$ pressures, there will still remain a certain range of control through the amplifier 215.

Should the pilot move his control lever from idle to some higher or full power position, the lever 113 of Figure 4 will be turned to the right or counterclockwise and compress the governor spring 111, opening the governor valve 101 and at the same time resetting the governor weights 117, whereupon there is an increase in the flow of fuel to the discharge nozzles 18 ($P_4$ pressure) and an increase in engine speed. Since the pumps 25, 25' will be driven at an increased speed, their output ($P_0$ pressure) will be increased for a given position of the wobble plates.

Figure 7:
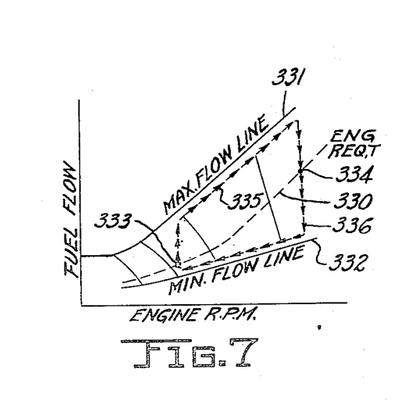
Figures 7, 8 and 9 are curve charts illustrating the operation of the herein disclosed fuel feeding system.
Figure 9:
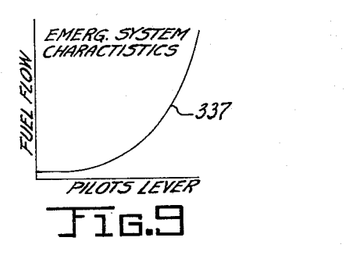

Referring to Figure 7, the curve indicated at 330 represents the fuel feed (pounds per hour) required for steady speed, that is, the rate at which fuel is fed to operate the engine at some predetermined speed at a given entering air density. It can be assumed that Figure 9 is for operation at sea level or a low altitude. The curve at 331 represents the maximum rate of fuel feed or fuel-air ratio for safe burner temperatures, say 1500° F.; while the curve at 332 represents the minimum rate of fuel feed at a given engine speed for deceleration without danger of burner failure. Let it be assumed that the engine is operating at speed 333 and the pilot opens governor valve 101 to a position which will produce speed 334; then the fuel supply during acceleration will follow the arrows 335. The initial increase in flow represented by the vertical arrows occurs as a result of the increase in the effective area of the feed restrictions 102 at the then existing speed. Should the pilot close the main throttle or governor valve 101 to decelerate, the fuel flow will follow the arrows 336.

When the area of the metering restrictions 102 is increased by opening the throttle valve, the differential across the regulator valve diaphragm 94 decreases, whereupon the regulator valve 99 moves towards open position, feed of fuel to the burners increases, and the engine speeds up until the governor weights 117 balance the setting of the governor spring 111 and an equilibrium condition is obtained. During acceleration and deceleration, the metering head or differential across the governor valve 101 and hence the rate of fuel feed will increase or decrease as a function of engine speed and hence will be automatically held within the predetermined upper or lower limits indicated by the curves 331 and 332.

Figure 8:
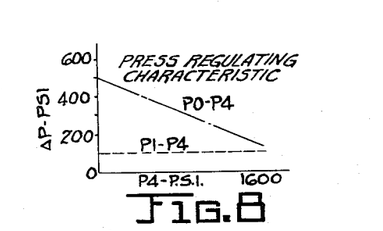

The curve chart of Figure 8 plots the $P_0$ to $P_4$ drop (Delta P) against metered fuel or $P_4$ pressure. Note that as the metered fuel or nozzle pressure increases, the drop from $P_0$ to $P_4$ decreases while the drop across the regulator and governor valves, $P_1$ to $P_4$, remains constant. Thus, as the governor valve 101 is opened and the control demands more fuel, the valve 219 of the amplifier 215 will be held closed and the pump control pistons 45 will move in a direction to increase the pump output at any given engine speed. Should the $P_0$ or pump discharge pressure at any time exceed the requirements, the rocker arm 216 will be rotated in a counterclockwise direction, valve 219 will open and vent the spring side of each piston 45, and the pump output will be less at the then existing engine speed.

On take-off, the pumps are put in maximum stroke position to insure an ample supply of fuel to the control unit; also, the emergency system is ready for automatic switchover from metering on the main or primary control. Thus, when the switch 310 is moved to a take-off position, the pump isolating solenoids 295 and 295' are energized, and at the same time, the emergency circuit is made ready so that should the nozzle pressure drop below a predetermined value, the pressure switch 317 of Figure 6 will close. When this happens, the emergency control solenoids 262 and 268 are energized, thereby closing the solenoid valve 260 and opening the solenoid valve 266. Since the emergency throttle valve 270 is linked to the main throttle or governor valve 101, the pilot has a single control lever for both the main system and the emergency system. After take-off, the pilot moves the switch 310 to a neutral position, and from then on the main control takes over.

Figure 9 illustrates how when operating on the emergency system the rate of fuel feed is varied in relation to movement of the pilot's control lever. In this instance, the control of fuel feed, indicated by the curve 337, becomes simply a matter of variation in the area of the emergency throttle restriction or orifice 271. There is no compensation for changes in entering air density, although each pump is protected against excessive pressure build-up by the valve 57.

Although only one embodiment of the invention has been illustrated and described, various changes in the form and relative arrangement of the parts may be made to suit requirements.

We claim:

1. In a fuel metering system for an engine, in combination, a fuel control device having a variable metering restriction and a throttle valve for varying the area of said restriction, a regulator valve for controlling the metering head across said restriction, means for positioning said regulator valve as a function of engine speed, an engine driven variable stroke displacement pump for pressurizing fuel to said control device having a pump control element movable to different positions to vary the pump stroke at a given engine speed, a valve located upstream of said regulator valve and adapted to maintain a substantially constant pressure drop across said regulator valve and throttle valve, said pump control element being responsive to the differential between the pressure upstream of said constant pressure drop valve and metered fuel pressure.

2. In a fuel metering system for an engine, in combination, a fuel control device having a fuel supply conduit provided with a metering restriction, a throttle valve for varying the area of said restriction, means for maintaining a substantially constant pressure drop across said device; an engine driven variable stroke displacement pump for pressurizing fuel to said device having a control element movable to different positions to vary the output of the pump at a given pump speed, means for automatically controlling said element in accordance with the demands of the control device, said means operating to maintain the pump output pressure above a predetermined value at low metering settings of the throttle valve.

3. In a fuel supply system for a gas turbine engine, a fuel control device having a fuel supply conduit provided with a metering restriction and a throttle valve for varying the area of said restriction, a regulator valve for controlling the metering head across said restriction, means for positioning said regulator valve as a function of engine speed, a constant pressure drop valve for maintaining a substantially constant drop across said regulator valve and throttle valve; an engine driven variable stroke displacement pump for pressurizing fuel to said device having a pressure responsive control element movable to different positions to vary the output of the pump at a given pump speed; and means for subjecting said element to fuel pressures varying as a function of the drop across the control device, said latter means comprising a pressure regulating valve, a member controlling said valve, and means for subjecting said member to the differential between the pressure upstream of said constant pressure valve and metered fuel pressure.

4. A fuel supply system as claimed in claim 3 wherein said member is adjustable to maintain the pump output pressure above a low unstable value at low metering pressures.

5. In a fuel metering system for an engine, a main throttle valve, an emergency throttle valve, means operatively interconnecting said valves for synchronous fuel metering movement, and means for selectively directing the fuel at will either to the main throttle valve or to the emergency throttle valve.

6. In a fuel metering system for an engine, a fuel control device comprising a main throttle valve, an emergency throttle valve, means operatively connecting said valves to a common control member, a fuel conduit for conducting fuel to said control device, means for pressurizing fuel in said conduit, means for diverting the flow of fuel to said emergency valve in the event of failure of the main control, and means responsive to a condition indicative of such failure for automatically controlling said diverting means.

7. In a fuel metering system for an engine, a main fuel control device having a main throttle valve and an emergency throttle valve, means operatively connecting said valves to a common control member, a fuel conduit for conducting fuel to said device, said conduit having a branch for conducting fuel to said emergency throttle valve, and a pair of change-over valves controllable to cut off the flow of fuel to said main throttle valve and direct the fuel to said emergency throttle valve in the event of failure of said main control.

8. A fuel control device as claimed in claim 7 wherein the said flow controlling valves are of the electric solenoid type and are operatively interconnected by an electric circuit having therein a pressure switch responsive to a pressure condition indicative of the need for emergency operation.

9. A fuel metering system as claimed in claim 7 wherein means responsive to changes in pressure of the metered fuel is arranged to automatically control said change-over valves.

10. In a fuel metering system for an aircraft engine, a fuel control device, said device being provided with a main throttle valve for normal fuel metering control and an emergency system including an emergency throttle valve for control of metering when the emergency system is in operation, means for supplying fuel under pressure to said device including a fuel conduit having a metering restriction controlled by said main throttle valve and a branch passage having a metering restriction controlled by said emergency throttle valve, a pair of electric solenoid change-over valves and an electric circuit therefor which when energized causes the latter valves to assume positions such as to close off flow of fuel to the main throttle valve and direct the fuel to the emergency throttle valve, said means for supplying fuel under pressure including a pair of variable stroke displacement pumps arranged to operate in parallel and each having a pump control element normally biased to maximum stroke position, means for communicating hydraulic operating pressure to said control elements to actuate the latter as a function of metered fuel flow, a pair of pump isolating solenoid valves in said circuit arranged to coact with said control elements in a manner such that when the circuit is energized, the valves close off hydraulic operating pressure to the control elements and permit the biasing means to move the control elements toward maximum stroke position, and a pilot's control switch in said circuit movable to take-off position, emergency position and normal flight position, said switch when in take-off position causing operation of the isolating valves and when in emergency position causing operation of the change-over valves and the isolating valves.

11. A fuel metering system as claimed in claim 10 wherein said throttle valves are operatively interconnected for control by a common control member.

12. A fuel metering system as claimed in claim 10 wherein there is a pressure switch in said electric circuit responsive to a condition indicative of the necessity for emergency operation, the arrangement being such that when the pilot's switch is in take-off position and said pressure switch is actuated, said change-over valves are also actuated to direct the flow of fuel to the emergency throttle valve.

13. In a fuel metering system for aircraft gas turbine engines, a fuel control device having a fuel conduit provided with a metering restriction and a throttle valve for varying the area of said restriction, a regulator valve for controlling the metering head across said restriction at a given position of the throttle valve, means for automatically controlling said regulator valve as a function of engine speed, means for automatically compensating the metering head for changes in density of the air flowing to the engine, low or idling speed limit means for said throttle valve for determining the minimum idle setting of said throttle valve, and an altitude idle jet arranged to by-pass fuel around said regulator valve and provide a predetermined amount of uncompensated idle flow across said throttle valve at high altitudes.

14. In a fuel metering system for aircraft gas turbine engines, a fuel control device having a fuel conduit provided with a metering restriction, a throttle valve for varying the area of said restriction, a low or idle speed stop for said throttle valve, means responsive to changes in entering air density for reducing the metering head across said restriction as density decreases as by an increase in altitude, and an altitude idle jet in series with said metering restriction and of less effective flow area than the area of the metering restriction when the throttle valve is up against its idle stop, the flow through said idle jet being uncompensated for changes in air density so that at extremely high altitudes the minimum idle flow remains constant.

15. In a system for supplying fuel under pressure to an engine, a valve for regulating fuel flow, means responsive to changes in engine speed for controlling said valve including a member for actuating the valve, and means for maintaining a minimum substantially constant fuel delivery pressure irrespective of engine speed when the latter is below a predetermined value comprising a second member movable with said valve, said second member providing an operating connection between said actuating member and valve when the latter is moved in an opening direction, resilient means tending to separate said members with a force of such magnitude as to effect separation only at engine speeds below such predetermined value and maintain the fuel flow substantially constant.

16. In a system for supplying fuel under pressure to an engine, a valve for regulating fuel flow, means responsive to changes in engine speed for controlling said valve including a member for actuating the valve, and means for maintaining a minimum substantially constant fuel delivery pressure irrespective of engine speed when the latter is below a predetermined value comprising a second member movable with said valve and providing an operating connection between said actuating member and valve when the latter is moved in an opening direction, and a substantially constant rate spring interposed between said members and tending to separate the latter with a force of such magnitude as to effect separation only at engine speeds below such predetermined value.

17. In a system as claimed in claim 16 wherein said spring is seated between a pair of telescoping members one of which constitutes said second member and is secured to a projecting portion or stem of said valve and the other of which is slidable on said projection or stem and is contacted by said valve actuating member.

18. In a system for supplying fuel under pressure to an engine, a throttle valve, a valve for regulating the fuel head across said throttle valve, means for controlling said regulating valve as a function of engine speed, and means for automatically maintaining the regulating valve in a position to establish a substantially constant metering head when the engine speed is below a predetermined value.

19. In a fuel metering system for an engine, in combination, a fuel control device having a variable metering restriction and a throttle valve arranged to vary the area of said restriction to accelerate and decelerate the engine, a regulator valve for controlling the metering head across said restriction, means responsive to an operating condition of the engine for controlling said regulator valve, means for maintaining a substantially constant pressure drop across said regulator valve and throttle valve, an engine driven variable stroke displacement pump for pressurizing fuel to said control device having a pump control element movable to different positions to vary the effective pump stroke at a given pump speed, and means responsive to the pressure drop across said control device for automatically positioning said element.

20. In a fuel metering system for an engine, in combination, a fuel control device having a variable metering restriction and a throttle valve arranged to vary the area of said restriction to accelerate and decelerate the engine, a regulator valve for controlling the metering head across said restriction, means responsive to an operating condition of the engine for controlling said regulator valve, a constant pressure drop throttling valve arranged to maintain a substantially constant pressure drop across said regulator valve and said throttle valve, an engine driven variable stroke displacement pump for pressurizing fuel to the control device and having a pump control element movable to different positions to vary the effective pump stroke at a given pump speed, and means responsive to the pressure differential between the pressure of the fuel upstream of said constant pressure drop valve and metered fuel pressure for automatically positioning said element.

21. In a fuel metering device for an engine, a housing defining a fuel chamber, an all-speed centrifugal governor and coacting valve assembly mounted in said chamber including a sleeve provided with a valve port, a metering valve having a slidable mounting with respect to said sleeve and provided with one or more metering orifices coacting with said port, a governor spring adjustable to reset the governor, means for variably tensioning said spring to select an operating speed for the engine, means accessible exteriorly of the housing for adjusting said sleeve with respect to said valve to facilitate calibration of the device, and means for maintaining a metering differential across said valve.

22. A fuel control device as claimed in claim 21 wherein there are means accessible exteriorly of said housing for adjusting the minimum engine speed setting of said governor independently of said spring tensioning means.

23. In a fuel control system for aircraft gas turbine engines, a fuel control device having a fuel conduit provided with a metering restriction, a throttle valve for varying the effective area of said restriction, a pilot's control member for resetting said valve, means responsive to changes in density of the air flowing to the engine for automatically reducing fuel flow across said restriction as density decreases as by an increase of altitude, means for indicating to a pilot a predetermined low fuel flow setting for said throttle valve, and an altitude idle flow orifice for conducting fuel to the engine when the throttle valve is at its low fuel flow setting, the flow through said idle orifice being uncompensated for changes in entering air density to ensure a minimum idle flow at high altitudes when the pilot throttles back to a low or idle speed setting.

24. In a fuel control system for aircraft gas turbine engines, a fuel control device having a fuel conduit provided with a metering restriction, a throttle valve for varying the effective area of said restriction, a pilot's control member for resetting said valve, means for automatically compensating the metering head across said restriction for changes in density of the air flowing to the engine, means for indicating to a pilot a predetermined low or idle speed setting for said throttle valve, an altitude idle flow orifice upstream of said metering restriction for conducting fuel to the engine when the pilot throttles back to a low or idle speed setting, means for adjusting the area of said restriction, flow through said orifice being uncompensated for changes in air density.

WALTER L. DRAY.
FRANK V. KUZMITZ.

REFERENCES CITED

The following references are of record in the file of this patent:

UNITED STATES PATENTS

| Number | Name | Date |
|---|---|---|
| 1,804,754 | Edwards | May 12, 1931 |
| 2,095,915 | Burger | Oct. 12, 1937 |
| 2,403,371 | Ifield et al. | July 2, 1946 |
| 2,450,535 | Watson et al. | Oct. 5, 1948 |
| 2,479,813 | Chamberlin et al. | Aug. 23, 1949 |

FOREIGN PATENTS

| Number | Country | Date |
|---|---|---|
| 627,261 | Germany | Mar. 11, 1936 |